United States Patent
Asamizu

(10) Patent No.: US 9,588,283 B2
(45) Date of Patent: Mar. 7, 2017

(54) LIGHT SOURCE DEVICE AND DISPLAY APPARATUS

(71) Applicant: Sakai Display Products Corporation, Sakai-shi, Osaka (JP)

(72) Inventor: Tomohiro Asamizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/647,593

(22) PCT Filed: Jan. 29, 2014

(86) PCT No.: PCT/JP2014/051921
§ 371 (c)(1),
(2) Date: May 27, 2015

(87) PCT Pub. No.: WO2014/129274
PCT Pub. Date: Aug. 28, 2014

(65) Prior Publication Data
US 2015/0316709 A1 Nov. 5, 2015

(30) Foreign Application Priority Data
Feb. 25, 2013 (JP) ................................. 2013-034756

(51) Int. Cl.
*F21V 7/04* (2006.01)
*F21V 8/00* (2006.01)
*G02F 1/1335* (2006.01)

(52) U.S. Cl.
CPC ......... *G02B 6/0088* (2013.01); *G02B 6/0033* (2013.01); *G02B 6/0055* (2013.01); *G02F 1/133605* (2013.01); *G02F 2201/54* (2013.01)

(58) Field of Classification Search
CPC .. G02B 6/0088; G02B 6/0033; G02B 6/0055; G02F 1/133605; G02F 2201/34; G02F 2201/54
See application file for complete search history.

(56) References Cited

U.S. PATENT DOCUMENTS

2008/0088764 A1* 4/2008 Son ...................... G02B 6/0086
349/58
2009/0237587 A1* 9/2009 Won ..................... G02B 6/0081
349/58

(Continued)

FOREIGN PATENT DOCUMENTS

JP 2010-135188 A 6/2010

*Primary Examiner* — Andrew Coughlin
*Assistant Examiner* — Alexander Garlen
(74) *Attorney, Agent, or Firm* — Rudy J. Ng; Bret E. Field; Bozicevic, Field & Francis LLP

(57) ABSTRACT

Provided are a light source device which includes a light guide plate configured to emit light made incident thereon through one surface thereof, a reflection sheet which has one surface facing the other surface of the light guide plate and is configured to reflect the light made incident on the light guide plate to one surface side of the light guide plate, and an opposite member oppositely disposed to the other surface of the reflection sheet, such that an occurrence of wrinkles and deflection in the reflection sheet may be prevented with a simple configuration, while surely fixing the position of the reflection sheet, and a display apparatus including the light source device.
The reflection sheet includes a first reflection sheet piece and a second reflection sheet piece, wherein the first reflection sheet piece is pinched by the light guide plate and the back cover, and the second reflection sheet piece is held by the first reflection sheet piece.

12 Claims, 10 Drawing Sheets

(56) References Cited

U.S. PATENT DOCUMENTS

2010/0165244 A1\* 7/2010 Shin .................. G02F 1/133308
  349/62
2013/0301295 A1\* 11/2013 Iwasaki ..................... F21V 7/00
  362/609

\* cited by examiner

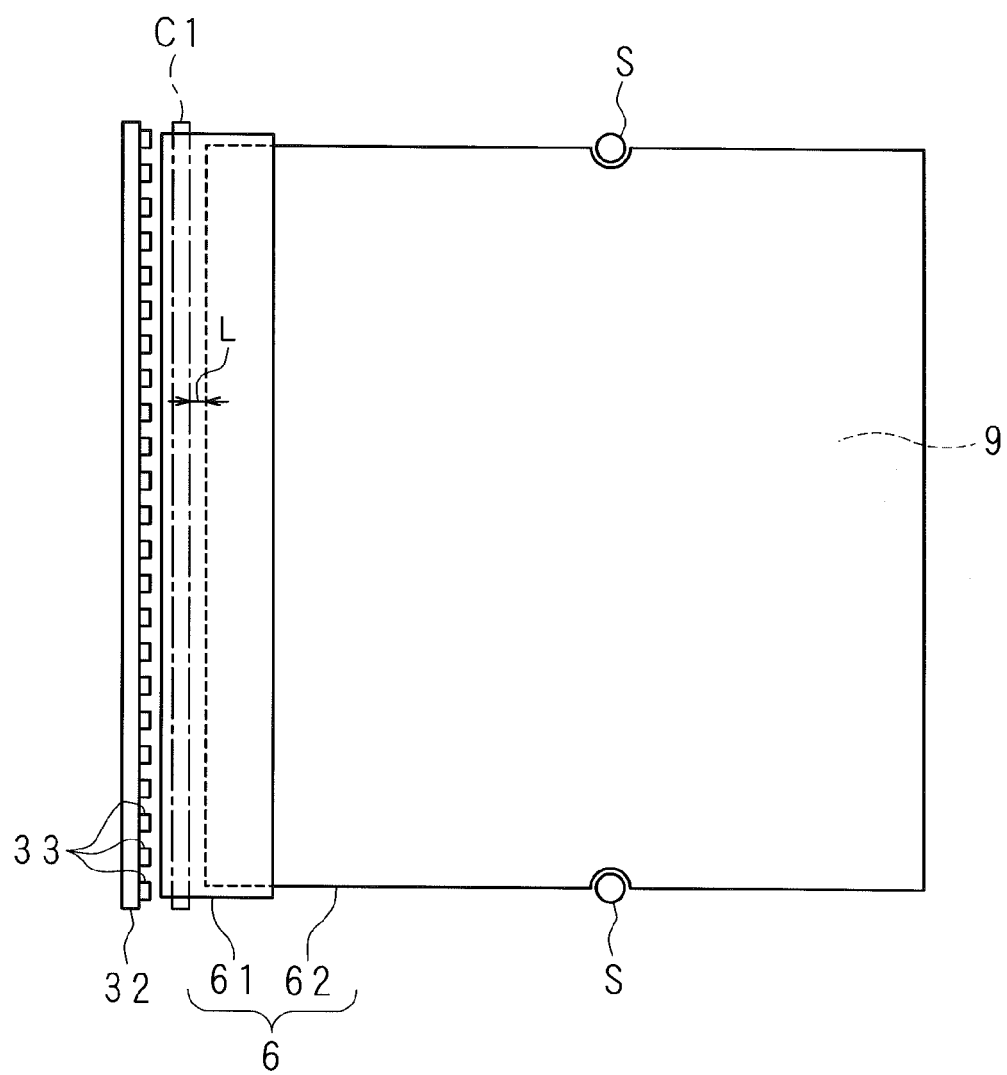
F I G. 8

LIGHT SOURCE DEVICE AND DISPLAY APPARATUS

This application is the national phase under 35 U.S.C. §371 of PCT International Application No. PCT/JP2014/051921 which has an International filing date of Jan. 29, 2014 and designated the United States of America.

TECHNICAL FIELD

The present invention relates to a light source device which includes a light guide plate for emitting light made incident thereon through one surface thereof, a reflection sheet which has one surface facing the other surface of the light guide plate and reflects the light made incident on the light guide plate to one surface side of the light guide plate, and an opposite member oppositely disposed to the other surface of the reflection sheet, and a display apparatus including the light source device.

DESCRIPTION OF RELATED ART

In the case of a so-called edge light type light source device which irradiates light to a side face of a liquid crystal panel, the light source device generally includes, on a rear side of the liquid crystal panel, a light guide plate which guides light from a light source to the liquid crystal panel, and a reflection sheet which reflects the light made incident on the light guide plate from the light source to the liquid crystal panel side.

However, when the reflection sheet is expanded by receiving an influence such as humidity, temperature, or the like, wrinkles and deflection may occur in the reflection sheet. Additionally, in a configuration in which the light guide plate and the reflection sheet are fixed together with each other, wrinkles and deflection may occur in the reflection sheet due to a difference in thermal expansion coefficients between the reflection sheet and the light guide plate.

As described above, when the wrinkles and deflection occur in the reflection sheet, an interval between the light guide plate and the reflection sheet becomes uneven, such that luminance unevenness in an image displayed on the liquid crystal panel may occur.

In relation to the above-described problem, Japanese Patent Laid-open Publication No. 2010-135188 discloses a liquid crystal display apparatus including a light guide plate which guides light from a light source to provide the light to a liquid crystal cell through a light emitting surface, a first frame disposed so as to surround a side face of the light guide plate, a reflection sheet which covers a rear surface of the light guide plate located on a side opposite to the light emitting surface thereof, wherein the first frame is provided with a receiving part into which an insertion part provided on an edge part of the reflection sheet is inserted, and the position of the reflection sheet with respect to the light guide plate is restrained by inserting the insertion part into the receiving part.

SUMMARY

However, in the liquid crystal display apparatus of Japanese Patent Laid-open Publication No. 2010-135188, since it is necessary to provide the insertion part on the edge part of a separate reflection sheet, and further, to provide the receiving part into which the insertion part is inserted in the first frame, the configuration of the apparatus itself is complicated. In addition, since the position of the reflection sheet is restrained only by inserting the insertion part into the receiving part, the reflection sheet is not reliably fixed to the first frame.

In consideration of the above-mentioned circumstances, it is an object of the present invention to provide a light source device which includes a light guide plate for emitting light made incident thereon through one surface thereof, a reflection sheet which has one surface facing the other surface of the light guide plate and reflects the light made incident on the light guide plate to the one surface side of the light guide plate, and an opposite member oppositely disposed to the other surface of the reflection sheet, wherein the reflection sheet includes a first reflection sheet piece and a second reflection sheet piece, the first reflection sheet piece is configured to be pinched by the light guide plate and the opposite member, and the second reflection sheet piece is configured to be held by the first reflection sheet piece, such that the second reflection sheet piece is freely extended and contracted, and thereby an occurrence of wrinkles and deflection in the reflection sheet may be prevented with a simple configuration, while surely fixing the position of the reflection sheet, and a display apparatus including the light source device.

According to one aspect of the present invention, there is provided a light source device which includes a light guide plate configured to emit light made incident thereon through one surface thereof, a reflection sheet which has one surface facing the other surface of the light guide plate and is configured to reflect the light made incident on the light guide plate to one surface side of the light guide plate, and an opposite member oppositely disposed to the other surface of the reflection sheet, wherein the reflection sheet may include: a first reflection sheet piece pinched by the light guide plate and the opposite member; and a second reflection sheet piece slidably sandwiched between the first reflection sheet piece and the light guide plate.

According to the present invention, the reflection sheet includes the first reflection sheet piece and the second reflection sheet piece, and in the state in which the first reflection sheet piece is pinched by the light guide plate and the opposite member, the second reflection sheet piece is held by being slidably sandwiched between the first reflection sheet piece and the light guide plate.

According to another aspect of the present invention, there is provided a light source device which includes a light guide plate configured to emit light made incident thereon through one surface thereof, a reflection sheet which has one surface facing the other surface of the light guide plate and is configured to reflect the light made incident on the light guide plate to one surface side of the light guide plate, and an opposite member oppositely disposed to the other surface of the reflection sheet, wherein the reflection sheet may include: a first reflection sheet piece pinched by the light guide plate and the opposite member; and a second reflection sheet piece slidably sandwiched between the first reflection sheet piece and the opposite member.

According to the present invention, the reflection sheet includes the first reflection sheet piece and the second reflection sheet piece, and in the state in which the first reflection sheet piece is pinched by the light guide plate and the opposite member, the second reflection sheet piece is held by being slidably sandwiched between the first reflection sheet piece and the opposite member.

In light source device according to the present invention, an interval may be formed between a contact part of the first reflection sheet piece with the light guide plate and an edge side of the second reflection sheet piece.

According to the present invention, for example, to prepare against that the second reflection sheet piece is expanded by heat generated during use of the light source device or humidification, a prescribed interval is provided between the contact part of the first reflection sheet piece with the light guide plate and the edge side of the second reflection sheet piece.

In light source device according to the present invention, an interval may be formed between a contact part of the first reflection sheet piece with the opposite member and an edge side of the second reflection sheet piece.

According to the present invention, for example, to prepare against that the second reflection sheet piece is expanded by heat generated during use of the light source device or humidification, a prescribed interval is provided between the contact part of the first reflection sheet piece with the opposite member and the edge side of the second reflection sheet piece.

In light source device according to the present invention, the second reflection sheet piece may have an area wider than the area of the first reflection sheet piece.

According to the present invention, the second reflection sheet piece having a wide area and a large deformation (for example, expansion) amount is held by the first reflection sheet piece having a narrower area than the second reflection sheet piece.

In light source device according to the present invention, the second reflection sheet piece may have a thickness the same as or greater than the thickness of the first reflection sheet piece.

According to the present invention, the second reflection sheet piece has the same thickness as the thickness of the first reflection sheet piece holding the second reflection sheet piece, or a thicker thickness than the first reflection sheet piece, thereby it is possible to prevent the second reflection sheet piece from being deformed due to its own weight.

According to another aspect of the present invention, there is provided a display apparatus including: the light source device according to any one of the above-described inventions; and a display panel which is provided on one surface side of the light guide plate and displays an image thereon using light made incident thereon through the light guide plate.

According to the present invention, the display panel, which is provided on the one surface side of the light guide plate, displays an image thereon using light made incident on the light guide plate and emitted from the one surface of the light guide plate.

According to the present invention, the reflection sheet is configured so as to include the first reflection sheet piece and the second reflection sheet piece, as well as the first reflection sheet piece is configured so as to be pinched by the light guide plate and the opposite member, and the second reflection sheet piece is configured so as to be held by the first reflection sheet piece, such that the second reflection sheet piece is freely extended and contracted, and thereby an occurrence of wrinkles and deflection in the reflection sheet may be prevented with a simple configuration, while surely fixing the position of the reflection sheet.

The above and further objects and features will move fully be apparent from the following detailed description with accompanying drawings.

BRIEF DESCRIPTION OF THE SEVERAL VIEWS OF THE DRAWINGS

FIG. 8 is an exemplified view describing an example of the relation between the light guide plate and the reflection sheet in the television receiving apparatus according to Embodiment 3 of the present invention.

DETAILED DESCRIPTION

Hereinafter, the case in which a light source device and a display apparatus according to embodiments of the present invention are applied to a television receiving apparatus will be described in detail, by way of an example, with reference to the accompanying drawings.

Embodiment 1

Figure 1:
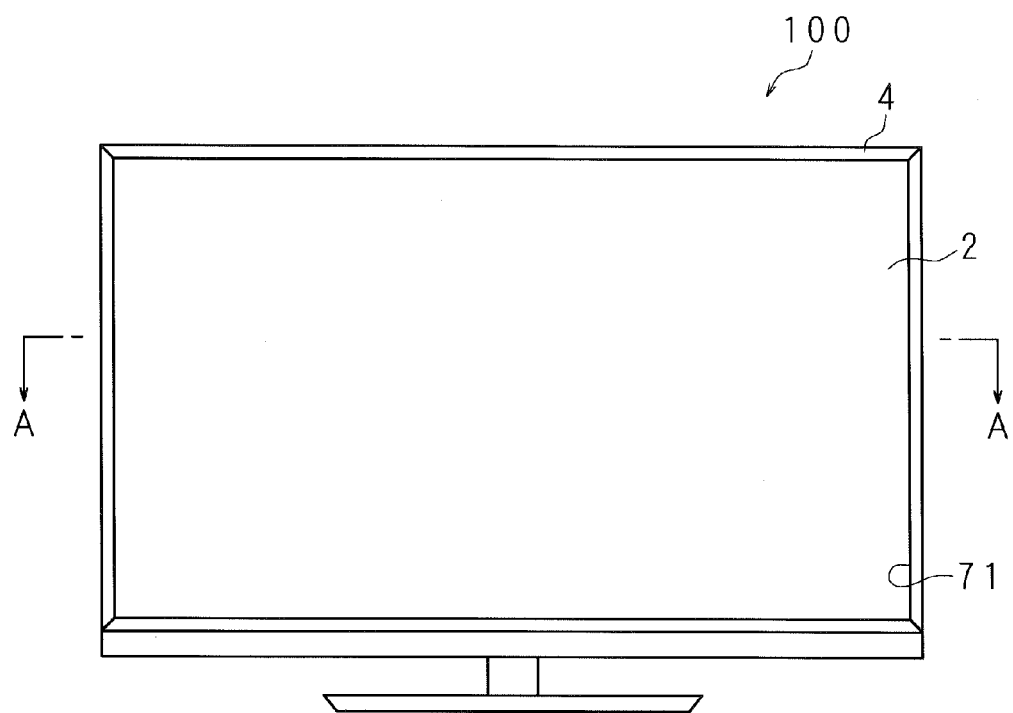
FIG. 1 is a front view illustrating an appearance of a television receiving apparatus according to Embodiment 1 of the present invention.

FIG. 1 is a front view illustrating an appearance of a television receiving apparatus according to Embodiment 1 of the present invention. In FIG. 1, a television receiving apparatus 100 according to Embodiment 1 of the present invention is illustrated. Hereinafter, for the convenience of explanation, a horizontal direction and a vertical direction of the television receiving apparatus are referred to as a lateral direction and a longitudinal direction, respectively.

Figure 2:
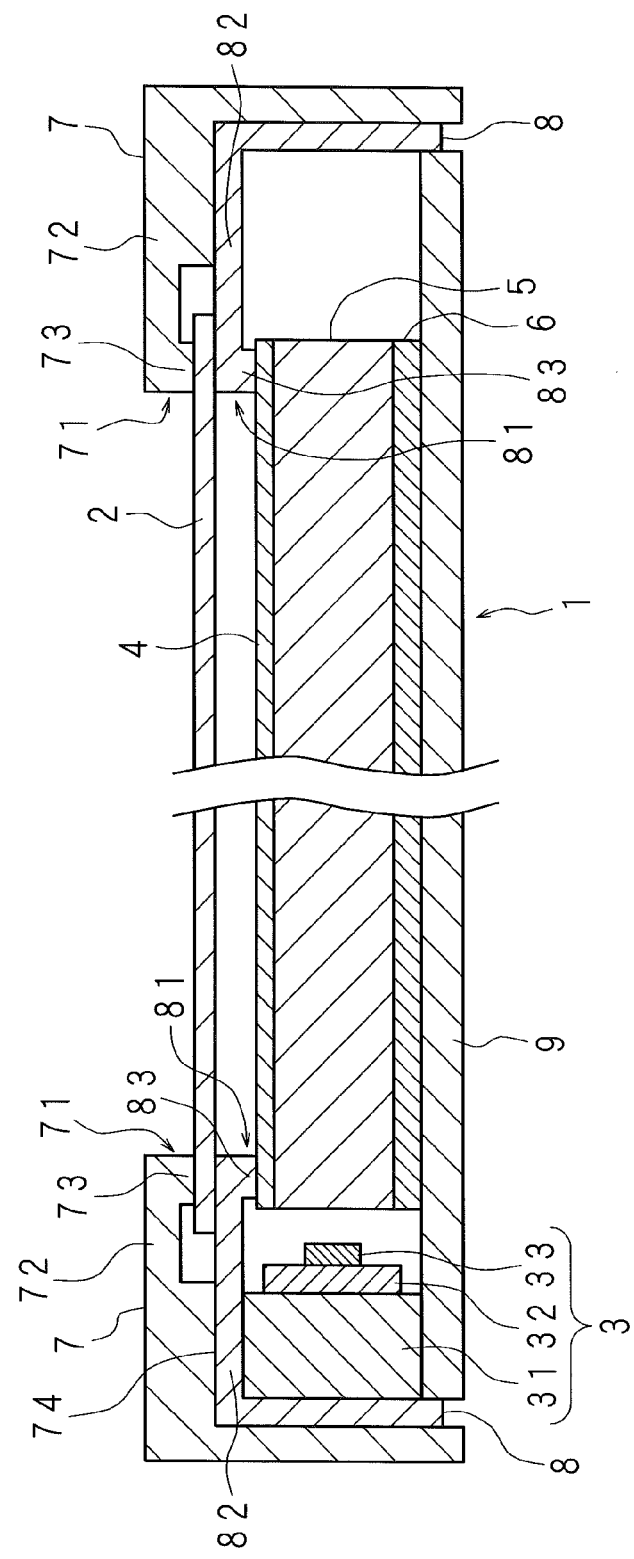
FIG. 2 is a transverse cross-sectional view taken along line A-A of FIG. 1.

FIG. 2 is a transverse cross-sectional view taken along line A-A of FIG. 1. The television receiving apparatus 100 according to Embodiment 1 of the present invention, as illustrated in FIG. 1, includes a rectangular liquid crystal display panel 2 displaying an image on one surface of a front side. In addition, a light source device 1 according to the present invention is disposed on a rear side of the liquid crystal display panel 2.

The light source device 1 includes a light source unit 3, an optical sheet 4, a light guide plate 5, and a reflection sheet 6.

The optical sheet 4 is disposed so that one surface thereof faces the other surface of the liquid crystal display panel 2, the light guide plate 5 is disposed so that one surface thereof faces the other surface of the optical sheet 4, and the reflection sheet 6 is disposed so that one surface thereof faces the other surface of the light guide plate 5.

A front cover 7 is disposed on the front side from the liquid crystal display panel 2. The front cover 7 is formed in a cylindrical shape having a rectangular bottom copying the shape of the one surface of the liquid crystal display panel 2 viewed from a user, and is formed to be L shape in a cross-sectional view. In addition, the front cover 7 has a rectangular display window 71 opened in the bottom thereof. The user may view an image displayed on the one surface of the liquid crystal display panel 2 through the display window 71.

Further, portions between edges of the bottom of the front cover 7 and edges of the display window 71 have a prescribed width. In other words, in the bottom of the front cover 7, residual portions other than the display window 71 are formed as hollow rectangular frame parts 72. Peripheral edge parts of the one surface of the liquid crystal display panel 2 are covered with the frame parts 72.

The hollow rectangular frame parts 72 are provided with panel holding parts 73 which protrude in a thickness direction of the liquid crystal display panel 2 on a rear side of one end part thereof, and abut the peripheral edge parts of the liquid crystal display panel 2 to push down the same. That is, the panel holding parts 73 hold the liquid crystal display panel 2 by pushing the peripheral edge parts of the liquid crystal display panel 2 to optical material holding frame 8 to be described below.

In addition, the liquid crystal display panel 2 is provided with a polarizing plate (not illustrated) on the other surface thereof, and is configured in such a manner that light made incident thereon is separated into p-waves (horizontal polarizing component) and s-waves (vertical polarizing component) by using the polarizing plate, then only the p-waves are transmitted toward the one surface, and the s-waves are absorbed by the polarizing plate. The liquid crystal display panel 2 may be an electrophoresis liquid crystal panel, for example.

In addition, the hollow rectangular frame parts 72 are provided with abutting surfaces 74 which are formed with a prescribed level difference on a rear side of the other end part thereof, so as to abut the optical material holding frame 8. The liquid crystal display panel 2, the optical material holding frame 8, and the light source device 1 are housed in the front cover 7.

The optical material holding frame 8 is provided on the other surface side of the liquid crystal display panel 2, which abut the peripheral edge parts of the other surface of the liquid crystal display panel 2 to support the liquid crystal display panel 2. As described above, the panel holding parts 73 push the peripheral edge parts of the liquid crystal display panel 2 to optical material holding frame 8 side, and the liquid crystal display panel 2 is pinched by the panel holding parts 73 and the optical material holding frame 8.

In addition, the optical material holding frame 8 are formed in a cylindrical shape having a rectangular bottom copying the shape of the bottom of the front cover 7, and are formed to be L shape in a cross-sectional view. Further, the optical material holding frame 8 has a rectangular opening 81 formed in the bottom thereof copying the display window 71.

In the bottom of the optical material holding frame 8, residual portions other than the opening 81 are formed as abutting parts 82 which abut the other surface of the liquid crystal display panel 2 and the abutting surfaces 74 of the front cover 7, and the abutting parts 82 are formed in a hollow rectangular shape. The light source device 1 is housed in the optical material holding frame 8.

The abutting parts 82 are provided with sheet holding parts 83 which protrude in the thickness direction of the optical sheet 4 on the rear side of one end part thereof along edges thereof, and abut and push down the peripheral edge parts of the optical sheet 4 to hold the optical sheet 4, the light guide plate 5 and the reflection sheet 6. That is, the sheet holding parts 83 hold the optical sheet 4, the light guide plate 5 and the reflection sheet 6 by pushing the peripheral edge parts of the optical sheet 4 to a back cover 9 (opposite member) to be described below.

The optical sheet 4 is a publicly known sheet which functions to diffuse and collect, etc., light emitted from the light source unit 3 and made incident thereon through the light guide plate 5, so as to more uniformly emit light toward the liquid crystal display panel 2. For example, the optical sheet 4 includes two diffusion sheets, and one prism sheet, wherein the prism sheet is installed between the two diffusion sheets.

One diffusion sheet of the two diffusion sheets, which is disposed on the light guide plate 5 side, is an optical sheet which functions to diffuse light made incident thereon from the light source unit 3 through the light guide plate 5 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet vertically to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The rectangular light guide plate 5 is disposed on the other side of the optical sheet 4. The light guide plate 5 guides light emitted by the light source unit 3 to the optical sheet 4 (liquid crystal display panel 2). For example, the light guide plate 5 may be configured in such a manner that one surface thereof facing the other surface of the optical sheet 4 has an emitting surface at which a pattern is formed so that the light made incident thereon from the light source unit 3 advances in the liquid crystal display panel 2 direction. Thereby, the light guide plate 5 may convert the light made incident thereon from the light source unit 3 into flat light to uniformly transmit it to the optical sheet 4 through the emitting surface.

In addition, the light guide plate 5 is made of a high transparency acrylic resin, for example. The reflection sheet 6 is disposed on the other surface of the light guide plate 5 for irregularly reflecting the light made incident thereon from the light source unit 3 and emitting it from the emitting surface of the light guide plate 5.

The light source unit 3 is provided around one side face of the light guide plate 5 in the lateral direction. The light source unit 3 has a strip-shaped substrate 32 oppositely disposed to the one side face of the light guide plate 5, a plurality of light sources 33, 33, . . . , 33 mounted on the substrate 32 in a long-side direction thereof, and a square column-shaped holding block 31 for holding the substrate 32 and the light sources 33, 33, . . . , 33.

The light source 33 may be, for example, a cold cathode fluorescent lamp (CCFL), external electrode fluorescent lamp (EEFL), hot cathode fluorescent lamp (HCFL), light emitting diode (LED) or the like.

The reflection sheet 6 is disposed so that one surface thereof faces the other surface of the light guide plate 5. The reflection sheet 6 is made of a white resin having excellent light reflecting properties, for example, and has a function to reflect the light made incident on the light guide plate 5 from the light sources 33 and return the reflected light to the emitting surface side of the light guide plate 5. In addition, the one surface of the reflection sheet 6 is applied with a paint having excellent light reflecting properties Meanwhile, the back cover 9 is disposed on the other side of the reflection sheet 6. The other surface of the reflection sheet 6 faces one surface of the back cover 9.

As described above, the sheet holding parts 83 press the peripheral edge parts of the optical sheet 4 to the back cover 9, and thereby, the optical sheet 4, the light guide plate 5 and the reflection sheet 6 are pinched by the sheet holding parts 83 and the back cover 9.

Figure 3:
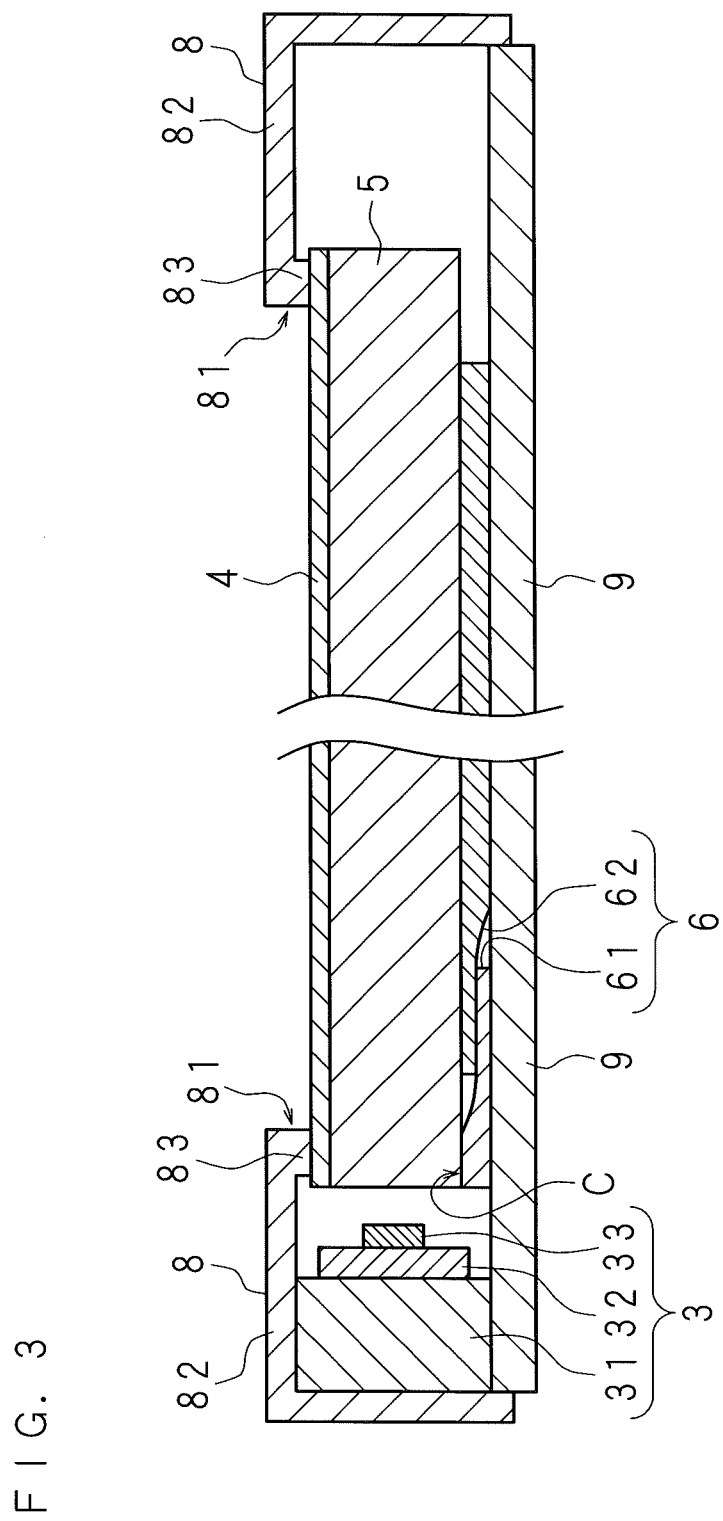
FIG. 3 is an exemplified view describing an example of a relation between a light guide plate and a reflection sheet in the television receiving apparatus according to Embodiment 1 of the present invention.
Figure 4:
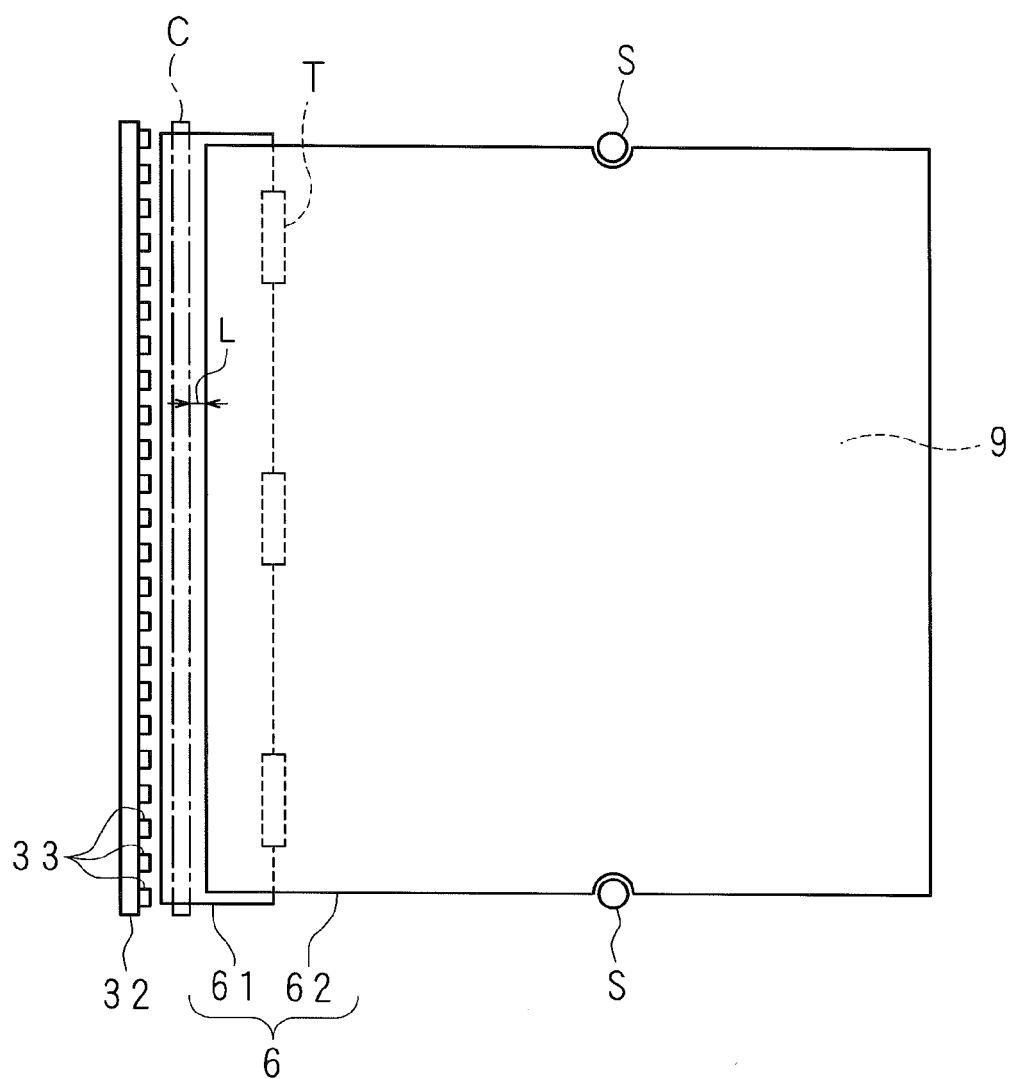
FIG. 4 is an exemplified view describing an example of the relation between the light guide plate and the reflection sheet in the television receiving apparatus according to Embodiment 1 of the present invention.

FIGS. 3 and 4 are exemplified views describing an example of a relation between the light guide plate 5 and the reflection sheet 6 in the television receiving apparatus 100 according to Embodiment 1 of the present invention.

In the television receiving apparatus 100 according to Embodiment 1 of the present invention, the reflection sheet 6 includes a first reflection sheet piece 61 and a second reflection sheet piece 62. The second reflection sheet piece 62 is held by the first reflection sheet piece 61.

The first reflection sheet piece 61 is formed in a strip shape, and is disposed in such a manner that the long-side direction thereof is parallel to a juxtaposed direction of the light sources 33, 33, . . . , 33, in other words, the long-side direction is set as the longitudinal direction. One side part of the first reflection sheet piece 61 in a short-side direction thereof is disposed around the light sources 33, 33, . . . , 33, and the other side part thereof in the short-side direction is fixed to the one surface of the back cover 9 by tapes T, for example.

At this time, as described above, the one side part of the first reflection sheet piece 61 in the short-side direction thereof is pinched by the sheet holding part 83 and the back cover 9. Thereby, one surface of the first reflection sheet piece 61 on the light guide plate 5 side and the other surface of the light guide plate 5 come in contact with each other at a position matching with the sheet holding part 83 in the thickness direction of the light guide plate 5. A contact part C of the first reflection sheet piece 61 with the light guide plate 5 extends in the long-side direction of the first reflection sheet piece 61.

Meanwhile, the second reflection sheet piece 62 has a rectangular shape having a slightly wider area than the display window 71, and corresponds to the one surface of the light guide plate 5 with a slightly smaller area than the one surface of the same. In addition, the second reflection sheet piece 62 is configured in such a manner that dimensions of one side thereof along the longitudinal direction are the same as or slightly smaller than the dimensions of the first reflection sheet piece 61 in the long-side direction thereof. Both side parts of the second reflection sheet piece 62 along the lateral direction are held to the back cover 9 by stands S, for example, at substantially central parts in the lateral direction.

In addition, one of both side parts of the second reflection sheet piece 62 on the light sources 33, 33, . . . , 33 side in the lateral direction is slidably sandwiched between the first reflection sheet piece 61 and the light guide plate 5 in a prescribed range thereof. That is, since the second reflection sheet piece 62 is only sandwiched and held by the first reflection sheet piece 61 and the light guide plate 5, and a pushing force of the sheet holding parts 83 is not directly applied thereto, the second reflection sheet piece 62 may slide in a direction along the plane thereof (a plane direction) while being sandwiched therebetween.

Further, the one of both side parts of the second reflection sheet piece 62 in the lateral direction is disposed at a prescribed interval L from the contact part C of the first reflection sheet piece 61 with the light guide plate 5 in the plane direction of the first reflection sheet piece 61. The interval L is defined by a heat expansion rate of the second reflection sheet piece 62, and is a gap for preparing against expansion of the second reflection sheet piece 62.

Meanwhile, in the second reflection sheet piece 62, residual portions other than the one side part in the lateral direction are pinched by the light guide plate 5 and the back cover 9.

Due to the above-described configuration, in the television receiving apparatus 100 according to Embodiment 1 of the present invention, it is possible to prevent an occurrence of the above-described problems in the art by the light source device 1.

Conventionally, since heat is generated in the light source device 1 during an operation of the television receiving apparatus 100, the reflection sheet undergoes thermal expansion. In this case, when the reflection sheet is configured so as to be fixed and to limit the elongation and contraction thereof, wrinkles and deflection may occur in the reflection sheet. In addition, as such, when the wrinkles, deflection, and the like occur in the reflection sheet, unevenness is generated in light made incident on the light guide plate 5 from the light sources 33, 33, . . . , 33 and reflected toward the liquid crystal display panel 2, thereby causing an occurrence of unevenness in brightness on the liquid crystal display panel 2.

Compared with this, in the television receiving apparatus 100 according to Embodiment 1 of the present invention, as described above, since the one of both side parts of the second reflection sheet piece 62 on the light sources 33, 33, . . . , 33 side is slidably sandwiched between the first reflection sheet piece 61 and the light guide plate 5, the second reflection sheet piece 62 may slide in the direction along the plane thereof. Further, an edge side of the one of both side parts of the second reflection sheet piece 62 is disposed at an interval L from the contact part C of the first reflection sheet piece 61 with the light guide plate 5.

Therefore, even when the reflection sheet 6 is thermally expanded by the heat generated in the light source device 1 during the operation of the television receiving apparatus 100, since the second reflection sheet piece 62 is freely extended and contracted, wrinkles, deflection, and the like may not occur in the reflection sheet 6 (second reflection sheet piece 62).

In more detail, in the television receiving apparatus 100 according to Embodiment 1 of the present invention, the second reflection sheet piece 62 of the reflection sheet 6 is configured so as to correspond to a region viewed from a user in the liquid crystal display panel 2, and only one side among four sides of the second reflection sheet piece 62 is slidably sandwiched between the first reflection sheet piece 61 and the light guide plate 5, as described above. Therefore, since not only the second reflection sheet piece 62 is freely extended and contracted by the thermal expansion in the other sides other than the one side thereof while being restricted with respect to position, but also the one side is configured to slide while it is apart from the contact part C of the first reflection sheet piece 61 with the light guide plate 5 by as much as the interval L, thus even when thermal expansion is generated, wrinkles, deflection, and the like may not occur therein. Accordingly, unevenness in brightness on the liquid crystal display panel 2 due to the wrinkles, deflection, and the like of the reflection sheet 6 (second reflection sheet piece 62) may not occur.

In the above description, the case in which the light source unit 3 is provided on only one end part side of both end parts of the light guide plate 5 in the lateral direction is described as an example, but the television receiving apparatus 100 according to Embodiment 1 of the present invention is not limited thereto, and it may be configured in such a manner that the light source unit 3 is provided on only one end part side of both end parts of the light guide plate 5 in the longitudinal direction.

Further, in the above description, the case in which the other side part of the first reflection sheet piece 61 in the short-side direction thereof is fixed to the one surface of the back cover 9 by the tapes T is described, but the television receiving apparatus 100 according to Embodiment 1 of the present invention is not limited thereto.

Figure 5:
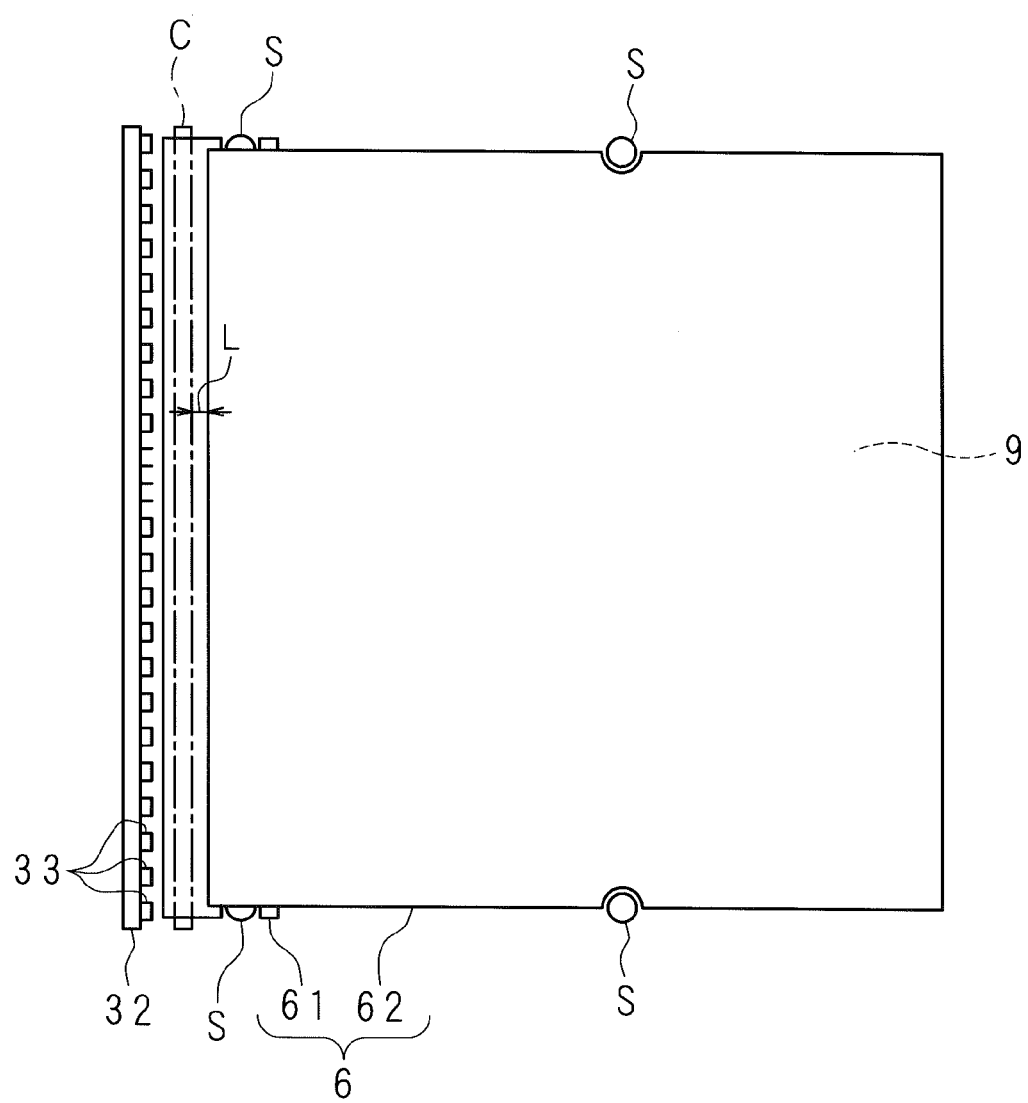
FIG. 5 is an exemplified view describing another example of the relation between the light guide plate and the reflection sheet in the television receiving apparatus according to Embodiment 1 of the present invention.

FIG. 5 is an exemplified view describing another example of the relation between the light guide plate 5 and the reflection sheet 6 in the television receiving apparatus 100 according to Embodiment 1 of the present invention.

In the present example, both end parts of the first reflection sheet piece 61 along the short-side direction thereof are held to the back cover 9 by the stands S at the substantially central part in the short-side direction. In addition, it may be configured in such a manner that the one of both side parts of the second reflection sheet piece 62 on the light sources 33, 33, . . . , 33 side in the lateral direction is disposed at the front side (light guide plate 5 side) from the stands S and S, in other words, so as to cover the stands S and S, thereby, the one side part is slidably sandwiched between the first reflection sheet piece 61 and the light guide plate 5 in the prescribed range thereof. Also, in this case, the edge side of the one side part of both side parts of the second reflection sheet piece 62 in the lateral direction is disposed at an interval L from the contact part C of the first reflection sheet piece 61 with the light guide plate 5.

Also, in such the case, as described above, since the one of both side parts of the second reflection sheet piece 62 on the light sources 33, 33, . . . , 33 side in the lateral direction is slidably sandwiched between the first reflection sheet piece 61 and the light guide plate 5, the one side part of the second reflection sheet piece 62 may slide in the direction along the plane thereof.

Therefore, when the reflection sheet 6 is thermally expanded by the heat generated in the light source device 1 during the operation of the television receiving apparatus 100, since not only the second reflection sheet piece 62 is freely extended and contracted by the thermal expansion in the other side parts other than the one side part thereof while being restricted with respect to position, but also the one side part is also freely extended and contracted, wrinkles, deflection, and the like may not occur in the reflection sheet 6 (second reflection sheet piece 62).

Embodiment 2

In Embodiment 1, the case in which the light source unit 3 is provided on only one end part side of the light guide plate 5 in the lateral direction is described as an example, but the present invention is not limited thereto.

Figure 6:
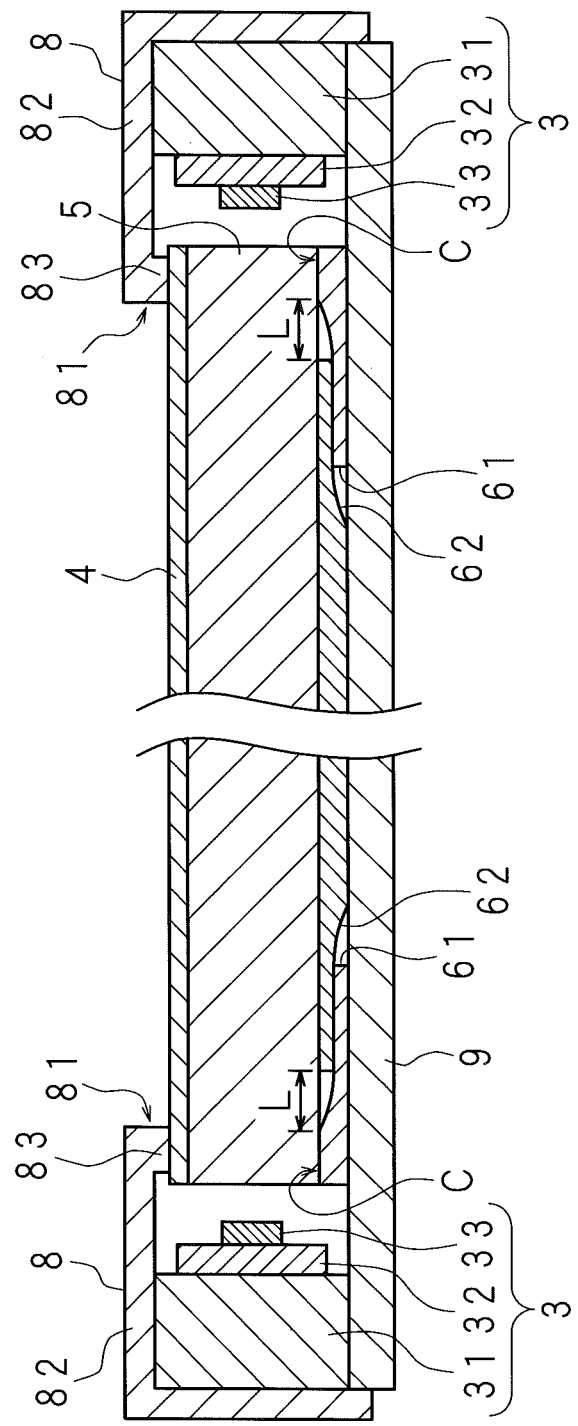
FIG. 6 is an exemplified view describing an example of a relation between a light guide plate and a reflection sheet in the television receiving apparatus according to Embodiment 2 of the present invention.

FIG. 6 is an exemplified view describing an example of a relation between the light guide plate 5 and the reflection sheet 6 in the television receiving apparatus according to Embodiment 2 of the present invention. The television receiving apparatus 100 according to Embodiment 2 of the present invention is different from the television receiving apparatus 100 according to Embodiment 1 of the present invention in the configuration of the light source device 1.

The light source device 1 of the television receiving apparatus 100 according to Embodiment 2 of the present invention is provided with light source units 3 and 3 on both end part sides of the light guide plate 5. That is, the light source units 3 are provided around the both side faces of the light guide plate 5 in the lateral direction, respectively. In other words, the light source units 3 and 3 are oppositely disposed with the light guide plate 5 interposed therebetween in the lateral direction.

One light source unit 3 of two light source units 3 and 3 has a strip-shaped substrate 32 oppositely disposed to the one side face of the light guide plate 5 in the lateral direction, a plurality of light sources 33, 33, . . . , 33 mounted on the substrate 32 in the long-side direction thereof, and a square column-shaped holding block 31 for holding the substrate 32 and the light sources 33, 33, . . . , 33.

In addition, the other light source unit 3 has a strip-shaped substrate 32 oppositely disposed to the other side face of the light guide plate 5 in the lateral direction, a plurality of light sources 33, 33, . . . , 33 mounted on the substrate 32 in the long-side direction thereof, and a square column-shaped holding block 31 for holding the substrate 32 and the light sources 33, 33, . . . , 33.

In any one of the light source units 3, the light source 33 may be a cold cathode fluorescent lamp (CCFL), external electrode fluorescent lamp (EEFL), hot cathode fluorescent lamp (HCFL), light emitting diode (LED) or the like.

In the television receiving apparatus 100 according to Embodiment 2 of the present invention, the reflection sheet 6 includes two first reflection sheet pieces 61 and 61, and one second reflection sheet piece 62. The second reflection sheet piece 62 is held by the two first reflection sheet pieces 61 and 61.

The first reflection sheet pieces 61 and 61 are formed in a strip shape, similar to Embodiment 1, and are disposed in such a manner that the long-side direction thereof is parallel to the juxtaposed direction of the light sources 33, 33, . . . , 33, in other words, the long-side direction is set as the longitudinal direction. One side part of the respective first reflection sheet pieces 61 and 61 in the short-side direction thereof is disposed around the corresponding light source units 3 and 3. In addition, the other side part of the respective first reflection sheet pieces 61 and 61 in the short-side direction is fixed to the one surface of the back cover 9 by tapes (not illustrated), for example.

At this time, the one side part of the respective first reflection sheet pieces 61 and 61 in the short-side direction thereof is pinched by the sheet holding part 83 and the back cover 9. Thereby, one surface of each first reflection sheet piece 61 on the light guide plate 5 side and the other surface of the light guide plate 5 come in contact with each other at a position matching with the sheet holding part 83 in the thickness direction of the light guide plate 5. Contact parts C and C of the respective first reflection sheet pieces 61 with the light guide plate 5 extend in the long-side direction of the first reflection sheet piece 61.

Meanwhile, the second reflection sheet piece 62 has a rectangular shape having a slightly wider area than the display window 71, and corresponds to the one surface of the light guide plate 5 with slightly smaller area than the one surface of the same. In addition, the second reflection sheet piece 62 is configured in such a manner that dimension of one side thereof along the longitudinal direction is the same as or slightly smaller than the dimensions of the first reflection sheet pieces 61 and 61 in the long-side direction thereof. Both side parts of the second reflection sheet piece 62 along the lateral direction are held to the back cover 9 by stands S, for example, at substantially central parts in the lateral direction.

In addition, both side parts of the second reflection sheet piece 62 in the lateral direction are slidably sandwiched between the first reflection sheet piece 61 and the light guide plate 5 in a prescribed range thereof. That is, since both side parts of the second reflection sheet piece 62 in the lateral direction are only sandwiched and held by the first reflection sheet piece 61 and the light guide plate 5, and the pushing force of the sheet holding parts 83 is not directly applied thereto, the second reflection sheet piece 62 may slide in a direction along the plane thereof while being sandwiched therebetween.

Further, each side part of the second reflection sheet piece 62 in the lateral direction is disposed at a prescribed interval L from each corresponding contact part C in the plane direction of the first reflection sheet piece 61. The interval L is defined by the heat expansion rate of the second reflection sheet piece 62.

Meanwhile, in the second reflection sheet piece 62, residual portions other than the both side parts in the lateral direction are pinched by the light guide plate 5 and the back cover 9.

Due to the above-described configuration, in the television receiving apparatus 100 according to Embodiment 2 of the present invention, it is possible to prevent an occurrence of the above-described problems in the art by the light source device 1.

In the television receiving apparatus 100 according to Embodiment 2 of the present invention, as described above, since both side parts of the second reflection sheet piece 62 are slidably sandwiched between the first reflection sheet pieces 61 and 61 and the light guide plate 5, the second reflection sheet piece 62 may slide in the direction along the plane thereof. Further, edge sides of these both side parts of the second reflection sheet piece 62 are disposed at intervals L from the respective corresponding contact parts C and C.

Therefore, in the television receiving apparatus 100 according to Embodiment 2 of the present invention, even when the reflection sheet 6 is thermally expanded by the heat generated in the light source device 1 during the operation of the television receiving apparatus 100, since the second reflection sheet piece is freely extended and contracted, wrinkles, deflection, and the like may not occur in the reflection sheet 6 (second reflection sheet piece 62).

In the above description, the case in which the light source units 3 and 3 are provided on two places of both end part sides of the light guide plate 5 in the lateral direction is described as an example, but the television receiving apparatus 100 according to Embodiment 2 of the present invention is not limited thereto, and it may be configured in such a manner that the light source units 3 and 3 are provided on both end part sides of the light guide plate 5 in the longitudinal direction.

The same parts as those in Embodiment 1 will be denoted by the same reference numerals, and will not be described.

Embodiment 3

In the above description, the case in which one and/or both side parts of the second reflection sheet piece 62 in the lateral direction (or the longitudinal direction) is/are slidably between the first reflection sheet piece 61 and the light guide plate 5 as an example, but the present invention is not limited thereto.

Figure 7:
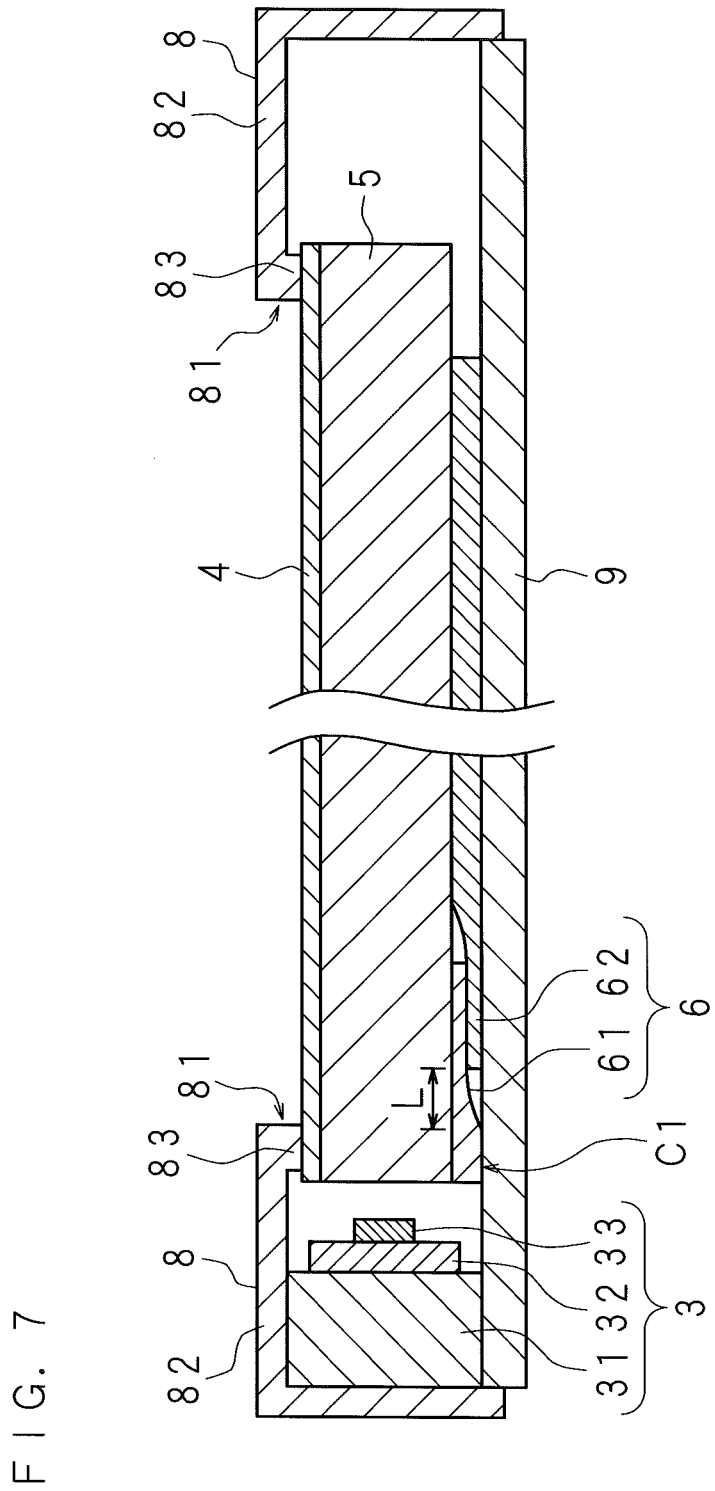
FIG. 7 is an exemplified view describing an example of a relation between a light guide plate and a reflection sheet in the television receiving apparatus according to Embodiment 3 of the present invention.

FIGS. 7 and 8 are exemplified views describing an example of a relation between a light guide plate 5 and a reflection sheet 6 in the television receiving apparatus 100 according to Embodiment 3 of the present invention.

In the television receiving apparatus 100 according to Embodiment 3 of the present invention, the reflection sheet 6 includes the first reflection sheet piece 61, and the second reflection sheet piece 62. The second reflection sheet piece 62 is held by the first reflection sheet piece 61.

The first reflection sheet piece 61 is formed in a strip shape, and is disposed in such a manner that the long-side direction thereof is parallel to the juxtaposed direction of the light sources 33, 33, . . . , 33. The one side part of the first reflection sheet piece 61 in the short-side direction thereof is disposed around the corresponding light sources 33, 33, . . . , 33.

At this time, the one side part of the first reflection sheet piece 61 in the short-side direction thereof is pinched by the sheet holding part 83 and the back cover 9. Thereby, the other surface of the first reflection sheet piece 61 and the one surface of the back cover 9 come in contact with each other at a position matching with the sheet holding part 83 in the thickness direction of the light guide plate 5. A contact part C1 of the first reflection sheet piece 61 with the back cover 9 extend in the long-side direction of the first reflection sheet piece 61.

Meanwhile the second reflection sheet piece 62 is the same as that of Embodiment 1, and therefore will not be described.

In addition, the one of both side parts of the second reflection sheet piece 62 on the light sources 33, 33, . . . , 33 side in the lateral direction is slidably sandwiched between the first reflection sheet piece 61 and the back cover 9 in a prescribed range thereof. That is, since the second reflection sheet piece 62 is only sandwiched and held by the first reflection sheet piece 61 and the back cover 9, and the pushing force of the sheet holding parts 83 is not directly applied thereto, the second reflection sheet piece may slide in a direction along the plane thereof while being sandwiched therebetween.

Further, the one of both side parts of the second reflection sheet piece 62 is disposed at a prescribed interval L from the contact part C1 of the first reflection sheet piece 61 with the back cover 9 in the plane direction of the first reflection sheet piece 61. The interval L is defined by the heat expansion rate of the second reflection sheet piece 62. Meanwhile, in the second reflection sheet piece 62, residual portions other than the one side part in the lateral direction are pinched by the light guide plate 5 and the back cover 9.

Due to the above-described configuration, in the television receiving apparatus 100 according to Embodiment 3 of the present invention, it is possible to prevent an occurrence of the above-described problems in the art by the light source device 1.

In the television receiving apparatus 100 according to Embodiment 3 of the present invention, as described above, since the one of both side parts of the second reflection sheet piece 62 on the light sources 33, 33, . . . , 33 side is slidably sandwiched between the first reflection sheet piece 61 and the back cover 9, the second reflection sheet piece 62 may slide in the direction along the plane thereof. Further, the edge side of the one side part of both side parts of the second reflection sheet piece 62 is disposed at an interval L from the contact part C1 of the first reflection sheet piece 61 with the back cover 9.

Therefore, even when the reflection sheet 6 is thermally expanded by the heat generated in the light source device 1 during operation of the television receiving apparatus 100, since the second reflection sheet piece is freely extended or contracted, wrinkles, deflection, and the like may not occur in the reflection sheet 6 (second reflection sheet piece 62).

In more detail, in the television receiving apparatus 100 according to Embodiment 3 of the present invention, the second reflection sheet piece 62 of the reflection sheet 6 is configured so as to correspond to a region viewed from the user in the liquid crystal display panel 2, and only one side among four sides of the second reflection sheet piece 62 is slidably sandwiched between the first reflection sheet piece 61 and the back cover 9, as described above. Therefore, since not only the second reflection sheet piece 62 is freely extended and contracted by the thermal expansion in the other sides other than the one side thereof while being restricted with respect to position, but also the one side is configured to slide while it is apart from the contact part C1 of the first reflection sheet piece 61 with the back cover 9 by as much as the interval L, thus even when thermal expansion is generated, wrinkles, deflection, and the like may not occur therein. Accordingly, unevenness in brightness on the liquid crystal display panel 2 due to the wrinkles, deflection, and the like of the reflection sheet 6 (second reflection sheet piece 62) may not occur.

In the above description, the case in which the light source unit 3 is provided on only one end part side of both end parts of the light guide plate 5 in the lateral direction is described as an example, but the television receiving apparatus 100 according to Embodiment 3 of the present invention is not limited thereto, it may be configured in such a manner that the light source unit 3 is provided on only one end part side of both end parts of the light guide plate 5 in the longitudinal direction.

The same parts as those in Embodiment 1 will be denoted by the same reference numerals, and will not be described.

Embodiment 4

In Embodiment 3, the case in which the light source unit 3 is provided on only one end part side of the light guide plate 5 in the lateral direction is described as an example, but the present invention is not limited thereto.

Figure 9:
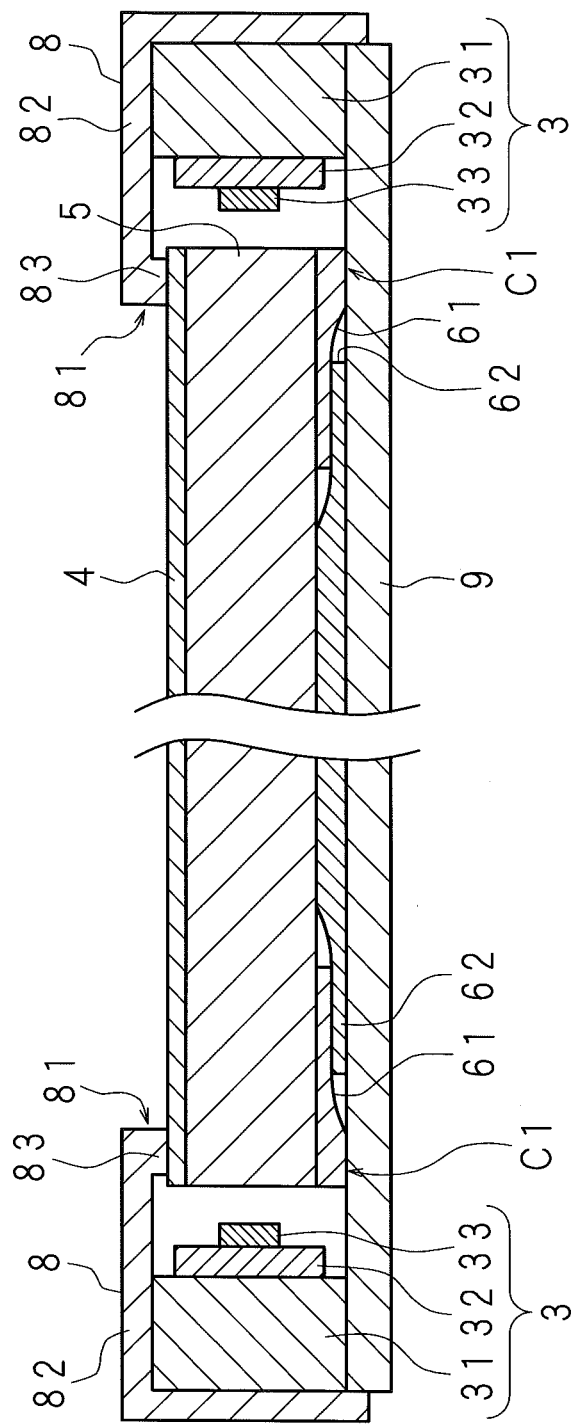
FIG. 9 is an exemplified view describing an example of a relation between a light guide plate and a reflection sheet in the television receiving apparatus according to Embodiment 4 of the present invention.

FIG. 9 is an exemplified view describing an example of a relation between a light guide plate 5 and a reflection sheet 6 in the television receiving apparatus 100 according to Embodiment 4 of the present invention. The television receiving apparatus 100 according to Embodiment 4 of the present invention is different from the television receiving apparatus 100 according to Embodiment 3 of the present invention in the configuration of the light source device 1.

The light source device 1 of the television receiving apparatus 100 according to Embodiment 4 of the present invention is provided with light source units 3 and 3 on both end part sides of the light guide plate 5 in the lateral direction, that is, around both side faces of the light guide plate 5, respectively. In other words, the light source units 3 and 3 are oppositely disposed with the light guide plate 5 interposed therebetween in the lateral direction.

One light source unit 3 of two light source units 3 and 3 has a strip-shaped substrate 32 oppositely disposed to the one side face of the light guide plate 5 in the lateral direction, a plurality of light sources 33, 33, . . . , 33 mounted on the substrate 32 in the long-side direction thereof, and a square column-shaped holding block 31 for holding the substrate 32 and the light sources 33, 33, . . . , 33.

In addition, the other light source unit 3 is disposed around the other side face of the light guide plate 5 in the lateral direction, and has a strip-shaped substrate 32, a plurality of light sources 33, 33, . . . , 33, and a square column-shaped holding block 31, similar to the one light source unit 3. Further, in any one of the light source units 3, the light source 33 may be a cold cathode fluorescent lamp (CCFL), external electrode fluorescent lamp (EEFL), hot cathode fluorescent lamp (HCFL), light emitting diode (LED) or the like.

In the television receiving apparatus 100 according to Embodiment 4 of the present invention, the reflection sheet 6 includes two first reflection sheet pieces 61 and 61, and one second reflection sheet piece 62. The second reflection sheet piece 62 is held by the two first reflection sheet pieces 61 and 61.

The first reflection sheet pieces 61 and 61 are formed in a strip shape, similar to Embodiments 1 to 3, and are disposed in such a manner that the long-side directions thereof are parallel to the juxtaposed directions of the light sources 33, 33, . . . , 33, in other words, the long-side directions are set as the longitudinal directions. The one side part of the respective first reflection sheet pieces 61 and 61 in the short-side direction thereof is disposed around the corresponding light source units 3 and 3.

At this time, since the one side part of the respective first reflection sheet pieces 61 and 61 in the short-side direction thereof is pinched by the sheet holding parts 83 and the back cover 9, contact parts C1 and C1 in which the other surface of each first reflection sheet piece 61 and the one surface of the back cover 9 come in contact with each other at positions matching with the sheet holding parts 83 in the thickness direction of the light guide plate 5 are formed. The contact parts C1 and C1 of the first reflection sheet piece 61 extend in the long-side direction thereof, respectively.

Meanwhile the second reflection sheet piece 62 is the same as that of Embodiment 3, and therefore will not be described.

In addition, both side parts of the second reflection sheet piece 62 in the lateral direction are slidably sandwiched between the first reflection sheet piece 61 and the back cover 9 in a prescribed range thereof. That is, since the second reflection sheet piece 62 is only sandwiched and held by the first reflection sheet piece 61 and the back cover 9, and the pushing force of the sheet holding parts 83 is not directly applied thereto, the second reflection sheet piece may slide in a direction along the plane thereof while being sandwiched therebetween.

Further, each side part of the second reflection sheet piece 62 in the lateral direction is disposed at a prescribed interval L from each corresponding contact part C1 of the first reflection sheet piece 61 in the plane direction thereof. The interval L is defined by the heat expansion rate of the second reflection sheet piece 62.

Meanwhile, in the second reflection sheet piece 62, residual portions other than the both side parts thereof in the lateral direction are pinched by the light guide plate 5 and the back cover 9.

Due to the above-described configuration, in the television receiving apparatus 100 according to Embodiment 4 of the present invention, it is possible to prevent an occurrence of the above-described problems in the art by the light source device 1.

In the television receiving apparatus 100 according to Embodiment 4 of the present invention, as described above, since both side parts of the second reflection sheet piece 62 are slidably sandwiched between the first reflection sheet piece 61 and the back cover 9, the second reflection sheet piece 62 may slide in the direction along the plane thereof. Further, edge sides of these both side parts of the second reflection sheet piece 62 are disposed at intervals L from the respective corresponding contact parts C1 and C1.

Therefore, in the television receiving apparatus 100 according to Embodiment 4 of the present invention, even when the reflection sheet 6 is thermally expanded by the heat generated in the light source device 1 during the operation of the television receiving apparatus 100, since the second reflection sheet piece is freely extended and contracted, wrinkles, deflection, and the like may not occur in the reflection sheet 6 (second reflection sheet piece 62).

In the above description, the case in which the light source units 3 and 3 are provided on two places of both end part sides of the light guide plate 5 in the lateral direction is described as an example, but the television receiving apparatus 100 according to Embodiment 4 of the present invention is not limited thereto, and it may be configured in such a manner that the light source units 3 and 3 are provided on both end part sides of the light guide plate 5 in the longitudinal direction.

The same parts as those in Embodiment 1 will be denoted by the same reference numerals, and will not be described.

Embodiment 5

In the above description, the case in which the light source units 3 and 3 are provided on two places of both end part sides of the light guide plate 5 in the lateral direction (or the longitudinal direction) is described as an example, but the present invention is not limited thereto.

Figure 10:
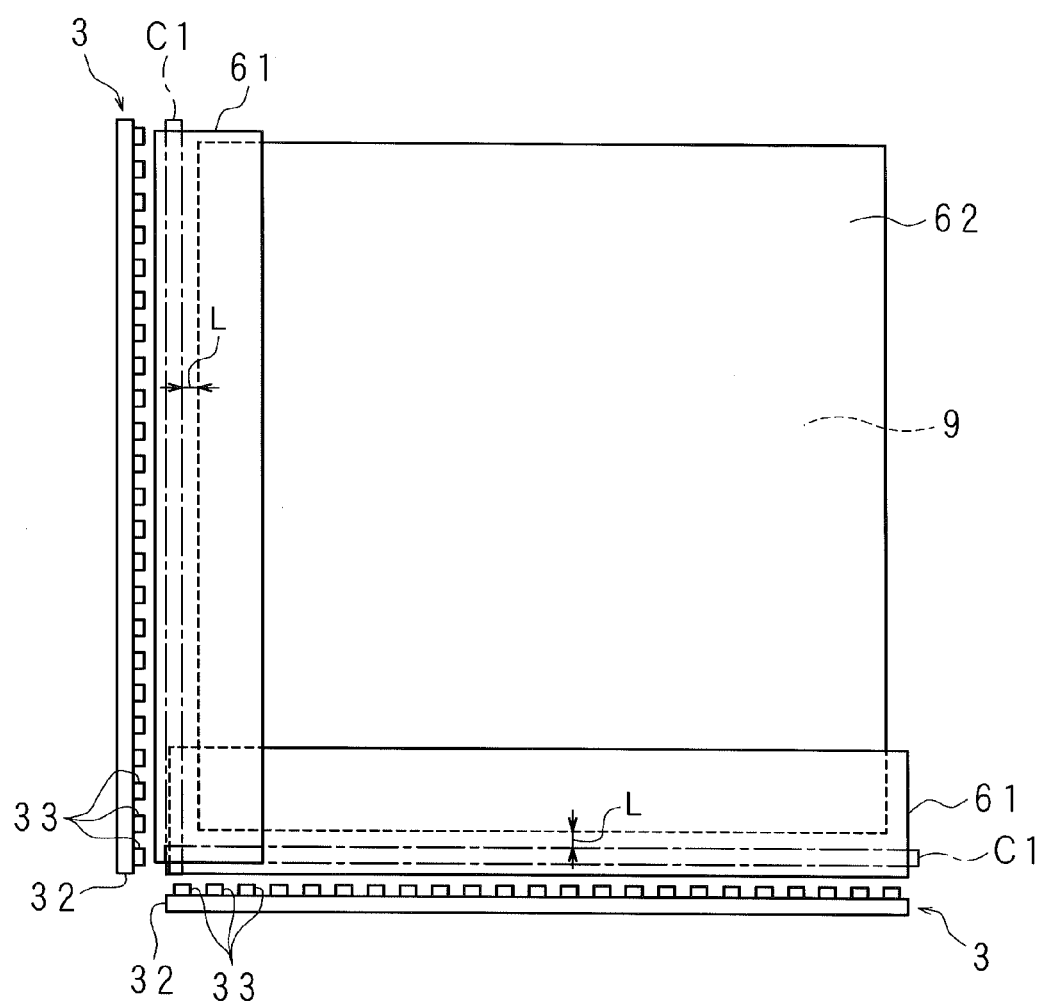
FIG. 10 is an exemplified view describing an example of a relation between a light guide plate and a reflection sheet in the television receiving apparatus according to Embodiment 5 of the present invention.

FIG. 10 is an exemplified view describing an example of a relation between a light guide plate 5 and a reflection sheet 6 in the television receiving apparatus 100 according to Embodiment 5 of the present invention.

In the light source device 1 of television receiving apparatus 100 according to Embodiment 5 of the present invention, light source units 3 and 3 are provided on one end part side of both end parts of the light guide plate 5 in the lateral direction and on one end part side of both end parts of the light guide plate 5 in the longitudinal direction, respectively. That is, the light source units 3 and 3 are provided around a side face of the one end part of both end parts of the light guide plate 5 in the lateral direction and around a side face of the one end part of both end parts of the light guide plate 5 in the longitudinal direction, respectively.

One light source unit 3 of two light source units 3 and 3 has a strip-shaped substrate 32 oppositely disposed to the one side face of the light guide plate 5 in the lateral direction, a plurality of light sources 33, 33, . . . , 33 mounted on the substrate 32 in the long-side direction thereof, and a square column-shaped holding block 31 for holding the substrate 32 and the light sources 33, 33, . . . , 33.

In addition, the other light source unit 3 is disposed around the one side face of the light guide plate 5 in the longitudinal direction, and has a strip-shaped substrate 32, a plurality of light sources 33, 33, . . . , 33, and a square column-shaped holding block 31, similar to the one light source unit 3.

In the television receiving apparatus 100 according to Embodiment 5 of the present invention, the reflection sheet 6 includes two first reflection sheet pieces 61 and 61, and one second reflection sheet piece 62. The second reflection sheet piece 62 is held by the two first reflection sheet pieces 61 and 61.

The first reflection sheet pieces 61 and 61 are formed in a strip shape, similar to Embodiments 1 to 4, and are disposed in such a manner that the long-side directions thereof are parallel to the juxtaposed directions of the light sources 33, 33, . . . , 33, in other words, the long-side directions are set as the longitudinal direction or the lateral direction. One side part of the respective first reflection sheet pieces 61 and 61 in the short-side direction thereof is disposed around the corresponding light source units 3 and 3.

At this time, since the one side part of the respective first reflection sheet pieces 61 and 61 in the short-side direction thereof is pinched by the sheet holding parts 83 and the back cover 9, contact parts C1 and C1 in which the other surface of each first reflection sheet piece 61 and the one surface of the back cover 9 come in contact with each other at positions matching with the sheet holding parts 83 in the thickness direction of the light guide plate 5 are formed. The contact parts C1 and C1 of the first reflection sheet piece 61 extend in the long-side direction thereof, respectively.

Meanwhile the second reflection sheet piece 62 is the same as that of Embodiments 1 to 4, and therefore will not be described.

In addition, side parts of the second reflection sheet piece 62 around the two light source units 3 and 3 (hereinafter, briefly referred to as side parts of light source side) are slidably sandwiched between the first reflection sheet piece 61 and the back cover 9 in a prescribed range thereof, respectively. That is, since each side part of the second reflection sheet piece 62 around the light source units 3 and 3 is only sandwiched and held by the first reflection sheet piece 61 and the back cover 9, and the pushing force of the sheet holding parts 83 is not directly applied thereto, the second reflection sheet piece may slide in a direction along the plane thereof while being sandwiched therebetween.

Further, each side part of light source side of the second reflection sheet piece 62 is disposed at a prescribed interval L from each corresponding contact part C1 in the plane direction of the first reflection sheet piece 61. The interval L is defined by a heat expansion rate of the second reflection sheet piece 62.

Meanwhile, in the second reflection sheet piece 62, residual portions other than the two side parts of light source side are pinched by the light guide plate 5 and the back cover 9.

Due to the above-described configuration, in the television receiving apparatus 100 according to Embodiment 5 of the present invention, it is possible to prevent an occurrence of the above-described problems in the art by the light source device 1.

In the television receiving apparatus 100 according to Embodiment 5 of the present invention, as described above, since both side parts of light source side of the second reflection sheet piece 62 are slidably sandwiched between the first reflection sheet piece 61 and the back cover 9, respectively, the second reflection sheet piece 62 may slide in the direction along the plane thereof. Further, edge sides of the side part of light source side of the second reflection sheet piece 62 are disposed at intervals L from the respective corresponding contact parts C1 and C1.

Therefore, in the television receiving apparatus 100 according to Embodiment 5 of the present invention, even when the reflection sheet 6 is thermally expanded by the heat generated in the light source device 1 during the operation of the television receiving apparatus 100, since the second reflection sheet piece is freely extended and contracted, wrinkles, deflection, and the like may not occur in the reflection sheet 6 (second reflection sheet piece 62).

The same parts as those in Embodiment 1 will be denoted by the same reference numerals, and will not be described.

In the above description, the television receiving apparatus 100 is an example of the display apparatus. Further, the present embodiment may be widely applied to various electronic devices without being limited to the television receiving apparatus, for example, the electronic devices including a notebook type personal computer, a mobile phone, a smart phone, a personal digital assistant (PDA), a game machine, or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device which includes a light guide plate configured to emit light made incident thereon through a first surface thereof, a reflection sheet which has a first surface facing a second surface of the light guide plate being opposite to the first surface of the light guide plate and is configured to reflect the light made incident on the light guide plate to the first surface side of the light guide plate, and an opposite member oppositely disposed to a second surface of the reflection sheet being opposite to the first surface of the reflection sheet, wherein the light source device comprises:
    an optical sheet oppositely disposed to the first surface of the light guide plate; and
    a sheet holding part configured to push a peripheral edge part of the optical sheet to the opposite member,
    wherein the reflection sheet comprises:
    a first reflection sheet piece pinched by the light guide plate and the opposite member at a position matching with the sheet holding part in a thickness direction of the light guide plate; and
    a second reflection sheet piece sandwiched between the first reflection sheet piece and the light guide plate at a position mismatching with the sheet holding part in the thickness direction of the light guide plate.

2. The light source device according to claim 1, wherein an interval is formed between a contact part of the first reflection sheet piece with the light guide plate and an edge side of the second reflection sheet piece.

3. The light source device according to claim 1, wherein the first reflection sheet piece has a strip shape and the second reflection sheet piece has a rectangular shape; and
    the second reflection sheet piece has an area which is wider than an area of the first reflection sheet piece and slightly smaller than an area of the first surface of the light guide plate.

4. The light source device according to claim 1, wherein the second reflection sheet piece has a thickness the same as or greater than the thickness of the first reflection sheet piece.

5. A display apparatus comprising:
    the light source device according to claim 1; and
    a display panel which is provided on the first surface side of the light guide plate and displays an image thereon using light made incident thereon through the light guide plate.

6. The light source device according to claim 3, further comprising
    a light source provided opposed to a side surface of the light guide plate, wherein
    a side part of the first reflection sheet piece with the strip shape, which is arranged in the vicinity of the light source is pinched by the sheet holding part and the opposite member.

7. A light source device which includes a light guide plate configured to emit light made incident thereon through a first surface thereof, a reflection sheet which has a first surface facing a second surface of the light guide plate being opposite to the first surface of the light guide plate and is configured to reflect the light made incident on the light guide plate to the first surface side of the light guide plate, and an opposite member oppositely disposed to a second surface of the reflection sheet being opposite to the first surface of the reflection sheet, wherein the light source device comprises:
    an optical sheet oppositely disposed to the first surface of the light guide plate; and
    a sheet holding part configured to push a peripheral edge part of the optical sheet to the opposite member,
    wherein the reflection sheet comprises:
    a first reflection sheet piece pinched by the light guide plate and the opposite member at a position matching with the sheet holding part in a thickness direction of the light guide plate; and
    a second reflection sheet piece sandwiched between the first reflection sheet piece and the opposite member at a position mismatching with the sheet holding part in the thickness direction of the light guide plate.

8. The light source device according to claim 7, wherein an interval is formed between a contact part of the first reflection sheet piece with the opposite member and an edge side of the second reflection sheet piece.

9. The light source device according to claim 7, wherein the first reflection sheet piece has a strip shape and the second reflection sheet piece has a rectangular shape; and
    the second reflection sheet piece has an area which is wider than an area of the first reflection sheet piece and slightly smaller than an area of the first surface of the light guide plate.

10. The light source device according to claim 7, wherein the second reflection sheet piece has a thickness the same as or greater than the thickness of the first reflection sheet piece.

11. A display apparatus comprising:
    the light source device according to claim 7, and
    a display panel which is provided on the first surface side of the light guide plate and displays an image thereon using light made incident thereon through the light guide plate.

12. The light source device according to claim 9, further comprising
    a light source provided opposed to a side surface of the light guide plate, wherein
    a side part of the first reflection sheet piece with the strip shape, which is arranged in the vicinity of the light source is pinched by the sheet holding part and the opposite member.

* * * * *